No. 737,941.                                              Patented September 1, 1903.

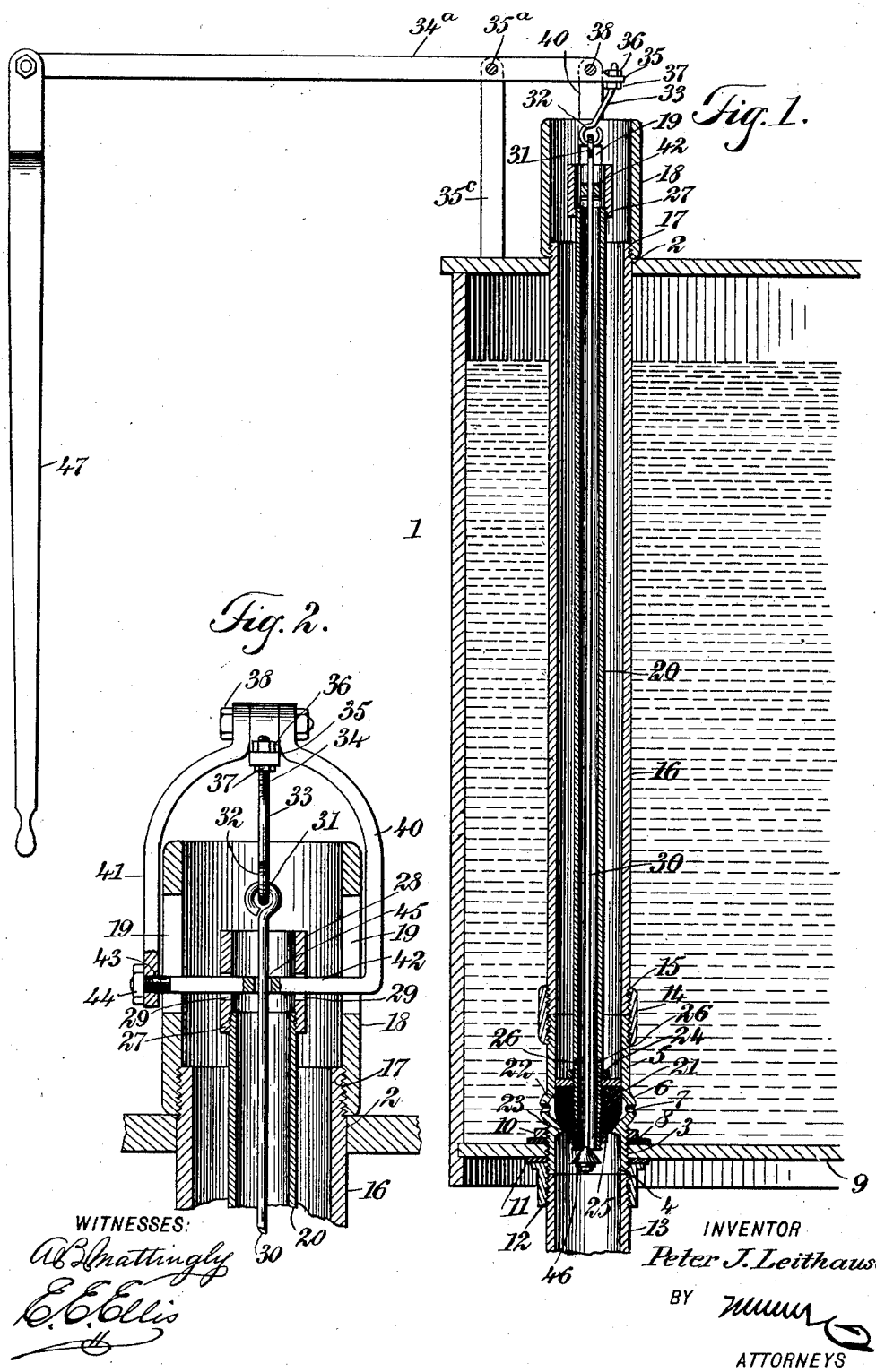

UNITED STATES PATENT OFFICE.

PETER JEROME LEITHAUSER, OF CLARENDON, TEXAS.

VALVE OR CUT-OFF FOR TANKS.

SPECIFICATION forming part of Letters Patent No. 737,941, dated September 1, 1903.

Application filed July 2, 1903. Serial No. 164,050. (No model.)

*To all whom it may concern:*

Be it known that I, PETER JEROME LEITHAUSER, a citizen of the United States, and a resident of Clarendon, in the county of Donley and State of Texas, have invented a new and Improved Valve or Cut-Off for Tanks, of which the following is a full, clear, and exact description.

This invention relates to valves; and it consists substantially in the construction, organization, and combinations of parts hereinafter particularly described, and pointed out in the claims.

My improvements have reference more especially to discharge-valves for tanks and the like; and one of the principal objects of my invention is to provide means for overcoming numerous disadvantages and objections found to exist with many other devices hitherto devised for similar purposes and also to provide a valve of this kind which is effective and reliable in use, as well as simple in construction and comparatively inexpensive to manufacture.

A further object of my invention is to provide a valve of the character referred to comprising but few parts, not liable to get out of order, and one also which may be easily and readily operated, besides possessing the capacity for long and repeated service.

The above and additional objects are attained by means substantially such as are illustrated in the accompanying drawings, forming a part of this specification, in which—

Figure 1 is a vertical sectional view illustrating my improvements as employed in connection with an ordinary water-tank; and Fig. 2 is an enlarged vertical sectional view of the upper part of my improvements, taken substantially at right angles to the plane of the section in Fig. 1.

Before proceeding with a more detailed description it may be stated that in the form of my improvements herein shown I employ a tank for containing water which may be located at any desired elevation or height and suitably supported in position, the same also being provided with alining or connecting openings in the top and bottom thereof, as will be explained. Fitting in said openings are the upper and lower portions, respectively, of a pipe of special construction and working within which is a hollow stem, also of special construction, said stem being provided with a specially-devised head, constituting practically a valve for controlling the flow of water from the tank, and working interiorly of this hollow stem is a rod, also provided with a valve, normally permitting air circulation about and within the pipe, the hollow stem and its head, and the outlet-pipe for the tank, thus preventing freezing of these parts in cold weather, and while I have herein represented my improvements in a certain preferred embodiment it will be understood, of course, that I am not limited to the precise details thereof in practice, since immaterial changes therein may be resorted to coming within the scope of my invention.

Specific reference being had to the drawings by the designating characters marked thereon, 1 represents a suitable tank for containing water, the same being provided in the top thereof with an opening 2 and in its bottom with a corresponding or connecting opening 3, the sides of which are preferably threaded, as shown, to receive the correspondingly-threaded lower portion 4 of a pipe-section 5, formed with an annular bulge or enlargement 6, having ports or openings 7 therein at intervals, said openings being in communication with the interior of the tank, as and for the purpose presently explained. Surrounding the said threaded portion 4 is a packing-ring 8, which rests against the inner side of the bottom 9 of the tank, said ring being held in place by a nut 10, and also fitting upon this threaded portion 4 and against the under side of the tank is another packing-ring 11, held in place by means of a flanged coupling-sleeve 12, screwed onto the lower projecting extremity of said portion 4, as shown, said coupling serving to connect with the pipe-section 5 the upper externally-threaded part of an outlet-pipe 13 for the water from the tank. Fitted to the upper externally-threaded part of said pipe-section 5 by means of any suitable coupling device, as 14, is the lower externally-threaded end portion 15 of a vertical pipe 16, which extends to the top of the tank, snugly fitting the sides of the opening 2 in the latter and having fitted to the projecting externally-threaded end 17 thereof the lower end of a detachable tubular member 18, having diametrically opposite vertical slots 19 formed therein.

Working within the pipe 16 is a hollow stem 20, which is considerably less in diameter than said pipe, the same also being screw-threaded externally at 21 for a suitable distance from its lower end and having fitted thereto a head or valve 22, the lower part of which normally rests upon an annular seat 23 therefor, formed interiorly of the lower edge of the said annular bulge or enlargement 6 of the pipe-section 5, said head or valve thus preventing escape of water from the tank through the ports or openings 7, as is apparent. To properly secure this head or valve 22 upon the hollow stem 20, suitable nuts or washers 24 and 25 are employed above and below the same, and it will be noted that this stem is provided a short distance above the upper surface of the head or valve 22 with air ports or openings 26, to be presently again referred to.

The upper end of the hollow stem 20 normally projects somewhat above the corresponding end of the pipe 16, and removably connected at 27 to this end of said stem is another but shorter tubular member 28, having diametrically opposite vertical slots 29 in the sides thereof, as shown. Working within said hollow valve-stem 20 is a vertical valve-rod 30, the upper end of which normally projects above the upper end of said tubular member 28 and is formed with an eye or loop 31, in which is movably connected the lower end 32 of a link 33, which is preferably screw-threaded at 34 for adjustably connecting the same with a lug 35, provided at the end of the shorter arm of a lever 34ᵃ by means of suitable nuts 36 and 37, as shown, said lever being pivoted or fulcrumed at 35ᵃ at the upper end of a stationary support 35ᶜ, mounted on the tank. Pivoted to said shorter lever-arm at 38 is a yoke comprising two arms 40 and 41, the former having substantially a right-angled member 42 passing through the two sets of slots 19 and 29, and the end of said member is threaded at 43 and passes through a corresponding opening therefor near the end of the arm 41 of the yoke and is secured by a nut 44 to said arm 41, said member 42 having an opening 45 therein, through which works the upper part or portion of the valve-rod 30, (see Fig. 2,) it being noted that the lower end of this rod is provided preferably with a conical valve 46, (see Fig. 1,) adapted to a seat therefor at the lower end of the hollow valve-stem 20. The outer end of the lever 34ᵃ is provided with an operating handle or rod 47, and it will be seen that upon pulling downwardly upon the handle or rod the valve-rod 30 will first be lifted, thereby tightly drawing said valve 46 against its seat, and immediately succeeding this movement the hollow valve-stem will be lifted, thereby allowing water to escape from the tank through the ports or openings 7 to the outlet-pipe 13. By now pushing upwardly on the longer arm of said lever 34ᵃ through the medium of said operating-rod 47 the parts referred to will be operated in a reverse manner to that just described, the head or valve 22 again being carried to its seat, thereby closing said ports or openings, and the valve 46 being also again carried to such position as to permit a circulation of air between the outlet-pipe 13 and pipe 16 via the ports or openings 26 in the said hollow stem. The parts may all be readily removed from the tank for any purpose desired, and, as will be apparent, they are readily fitted to one another and easily taken apart.

It will be seen from the construction and organization shown and described that any water which may possibly get into the hollow stem will always drain off through the outlet 13 in the normal position of the parts.

It will be understood that the end of the operating-rod 47 is to extend down to within convenient reach of the hand of the operator.

Having thus described my invention, I claim as new and desire to secure by Letters Patent—

1. In a tank, a pipe fitted in corresponding openings in the top and bottom thereof, and formed at its lower portion with ports or openings within the tank, said pipe also having an outlet at its lower end, a hollow stem having a head controlling said ports, and itself provided with air-ports, a rod within said stem, having at its lower end a valve, and means for operating the rod and stem to close said valve and open said first-named ports.

2. In a tank, a pipe fitted in an opening in the top thereof, a pipe-section fitting in a corresponding opening in the bottom of the tank, and a coupling uniting said elements, said section being provided with ports within the tank, a hollow stem having a head controlling said ports, and itself provided with air-ports, a rod within said stem, having at its lower end a valve, and means for operating the rod and stem to close said valve and open said first-named ports.

3. In a tank, a pipe fitted in corresponding openings in the top and bottom thereof, and formed at its lower portion with ports or openings within the tank, said pipe also having an outlet at its lower end, a hollow stem having a head controlling said ports, and itself provided with air-ports, a rod within said stem, having at its lower end a valve, a yoke having movable connection with the upper end of the stem, a link having similar connection with the upper end of the rod, and an operating-lever with which each of the two last-named elements are also in movable connection.

4. In a tank, a pipe fitted in an opening in the top thereof, a pipe-section fitting in a corresponding opening in the bottom of the tank, and a coupling uniting said elements, said section being provided with ports within the tank, a hollow stem having a head controlling said ports, and itself provided with air-ports, a rod within said stem, having at its lower end a valve, a yoke having movable connection with the upper end of the stem, a link having similar connection with the upper end of the rod, and an operating-lever with which each of the two last-named elements are also in movable connection.

5. In a tank, a pipe fitted in corresponding openings in the top and bottom thereof, and formed at its lower portion with ports or openings within the tank, a hollow stem having a head controlling said ports, and itself provided with air-ports, one end of said stem also passing through the head, a rod within said stem, having a valve at its lower end beneath the head, and means for operating the rod and stem to close said valve and open the ports first named.

6. In a tank, a pipe fitted in an opening in the top thereof, a pipe-section fitting in a corresponding opening in the bottom of the tank, and a coupling uniting said elements, said section being provided with ports within the tank, a hollow stem having a head controlling said ports, and itself provided with air-ports, one end of said stem also passing through the head, a rod within the stem, having a valve at its lower end beneath the head, and means for operating the rod and stem to close said valve and open the said first-named ports.

7. In a tank, a pipe fitted in corresponding openings in the top and bottom thereof, and formed at its lower portion with ports or openings within the tank, a hollow stem having a head controlling said ports, and itself provided with air-ports, one end of said stem also passing through the head, a rod within said stem, having at its lower end a valve, a link having movable connection with the upper end of the rod, a yoke having similar connection with the upper end of the stem, and an operating-lever with which each of the two last-named elements are also in movable connection.

8. In a tank, a pipe fitted in corresponding openings in the top and bottom thereof, and formed at its lower portion with ports or openings within the tank, said pipe being provided at its upper end with a tubular section having opposite vertical slots, a hollow stem working in said pipe, and having at its lower end a head, controlling said ports, and at its upper end a tubular section also having opposite vertical slots, said stem itself being provided with air-ports, a rod working in the stem, having at its lower end a valve, a yoke having a member passing through each set of the slots mentioned, a link having movable connection with the upper end of the rod, and an operating-lever with which said yoke and link each have a movable connection.

In testimony whereof I have signed my name to this specification in the presence of two subscribing witnesses.

PETER JEROME LEITHAUSER.

Witnesses:
D. B. HILL,
JNO. E. COOKE.